J. KRIZEK.
RESILIENT WHEEL.
APPLICATION FILED JUNE 12, 1918.
1,286,655.
Patented Dec. 3, 1918.
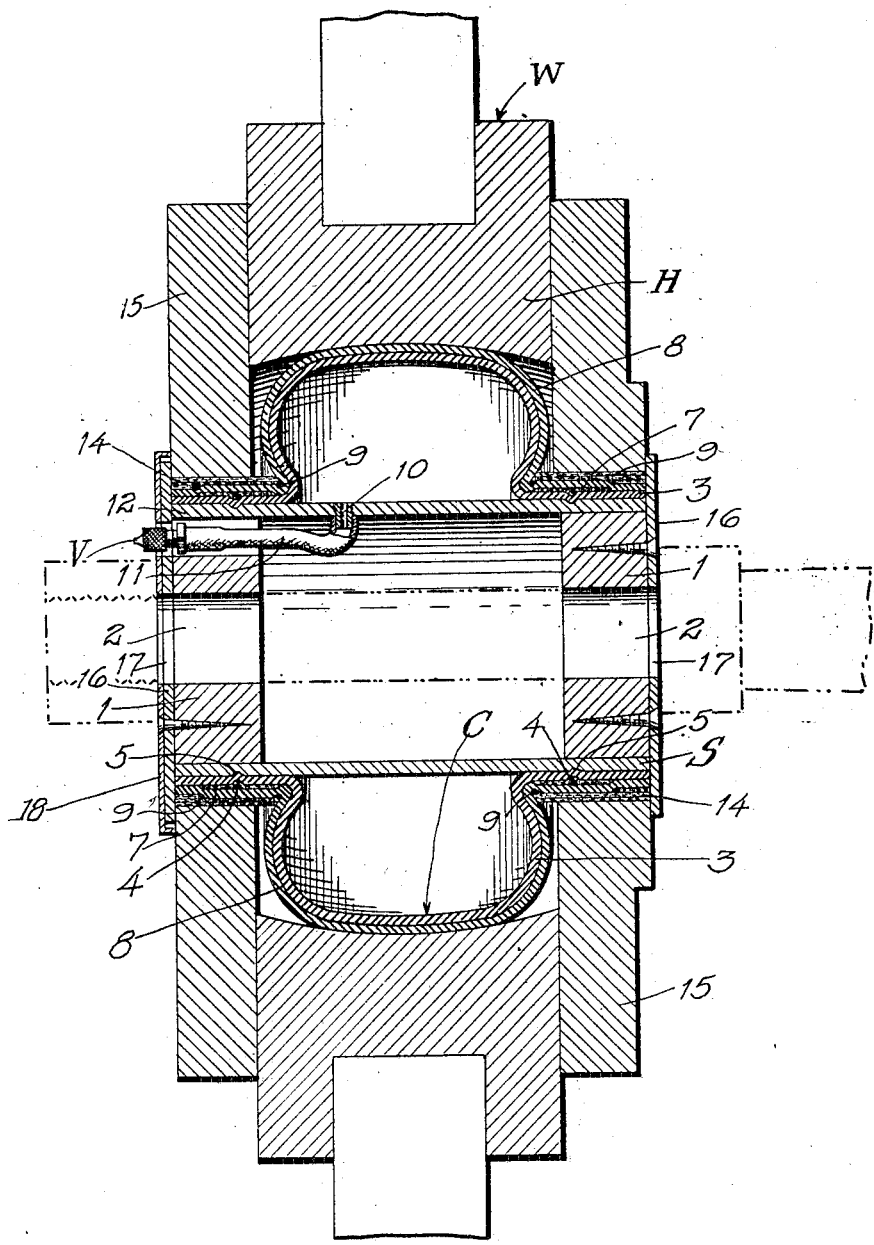
Inventor
Joseph Krizek
By Watson E. Coleman
Attorney

UNITED STATES PATENT OFFICE.

JOSEPH KRIZEK, OF GALLUP, NEW MEXICO, ASSIGNOR OF ONE-THIRD TO PETER KITCHEN AND ONE-THIRD TO JOSEPH IVOR PISCEK, BOTH OF GALLUP, NEW MEXICO.

RESILIENT WHEEL.

1,286,655.   Specification of Letters Patent.   Patented Dec. 3, 1918.

Application filed June 12, 1918. Serial No. 239,631.

*To all whom it may concern:*

Be it known that I, JOSEPH KRIZEK, a subject of the Emperor of Austria, residing at Gallup, in the county of McKinley and State of New Mexico, have invented certain new and useful Improvements in Resilient Wheels, of which the following is a specification, reference being had to the accompanying drawings.

This invention relates to certain improvements in resilient wheels and has relation more particularly to a device of this general character wherein a pneumatic hub is employed and it is an object of the invention to provide a device of this general character having novel and improved means whereby an inflatable member comprised in the hub structure is effectively protected against injury and whereby the wheel is particularly adapted for use in connection with heavy vehicles, such as military trucks or the like.

It is also an object of the invention to provide a novel and improved device of this general character wherein the pneumatic member comprised within the hub structure may be readily inflated at a point at one side of the wheel and preferably through the medium of a conduit extending exteriorly of the hub through the outer end thereof.

The invention consists in the details of construction and in the combination and arrangement of the several parts of my improved resilient wheels whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein is disclosed a fragmentary transverse sectional view illustrating a resilient wheel constructed in accordance with an embodiment of my invention.

As disclosed in the accompanying drawings W denotes a wheel body including a hub H. Arranged at the axial center of the hub H is the sleeve S formed preferably of metal and the opposite ends of the sleeve S are closed by the heads 1. The heads 1 of the sleeve S at the axial centers thereof are provided with the openings 2 through which an axle or the like is directed. Interposed between the sleeve S and the wall of the bore of the hub H is a cushioning means C of an inflatable type and which is carried directly by the sleeve S. The means C, when inflated, serves to absorb the shocks or jars incident to the travel of the wheel and by having the cushioning means C arranged within the hub it will be at once self-evident that said cushioning means is effectively protected against puncture or other injury. The cushioning means C as herein disclosed comprises two laminations of rubber of the quality generally employed in the production of inner tubes for tires now generally employed and the inner lamination has its opposite end portions clamped to the opposite end portions of the sleeve S by the binding members 4 herein disclosed as formed from wire of requisite gage and which binding members coact with the annular grooves 5 formed in the opposite end portions of the sleeve S and extending circumferentially therearound. Interposed between the binding members 4 and the inner lamination 3 is a strip of textile fabric 7 of canvas or similar material whereby the lamination 3 is protected against injury by the binding members 4 coacting therewith.

The second or outer lamination 8 has its opposite end portions clamped to the sleeve S by the circumferentially disposed annular binding members 9 arranged at opposite sides of the adjacent strip of textile fabric 7 whereby the fabric strip 7 serves as a medium to assure an air-tight connection between the laminations 3 and 8. The binding members 9 are also preferably formed from wire of requisite gage. It will also be understood that the binding members 4 and the coacting textile strips 7 serve to assure an air-tight engagement of the inner lamination 3 with the sleeve S. Disposed through and extending inwardly of the sleeve S is a nipple 10 to which is suitably engaged and in communication therewith the conduit or tube 11. The conduit or tube 11 is of a length to extend exteriorly of the sleeve S through the opening or recess 12 formed in the peripheral portion of the outer head 1. The outer or free end portion of the conduit or tube 11 is suitably engaged with an inflating valve V of any desired type whereby it will be perceived that the cushioning means as afforded by the laminations 3 and 8 may be readily and conveniently inflated for contact with the wall of the bore of the hub H.

Wrapped around the outer lamination 8 at the opposite ends of the sleeve S are the binding strips 14 preferably of textile material and which serve as a protection for the outer lamination 8 and also afford additional means for maintaining an air-tight connection of the laminations 3 and 8 with the sleeve S and with each other.

The sleeve S is of a length to extend beyond the opposite ends of the hub H and mounted upon said extended end portions are the disks 15 of a diameter to overlie the inner marginal portion of the hub H so that the entrance of foreign matter within the bore of the hub is prevented so that the cushioning means is effectively protected against injury from an external source.

The disks 15 are held in applied position upon the sleeve S by the plates 16 secured to the heads 1 of the sleeve S and which plates are provided with the openings 17 in register with the openings 2 of the heads 1 and through which the axle or the like is also insertible. Overlying the outer face of the outer plate 16 is a wear plate 18, although this plate, if desired, may be omitted.

From the foregoing description, it is thought to be obvious that a resilient wheel constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In combination with the hub of a wheel body, a sleeve disposed therethrough, said sleeve and hub being capable of relative movement, a lamination of expansible material surrounding the sleeve, strips disposed around the marginal portions of the lamination, binding members engaged around the strips for clamping the lamination to the sleeve, a second lamination of expansible material overlying the first lamination, and binding means coacting with each marginal portion of the second lamination and positioned at opposite sides of a strip, and means for expanding the laminations by inflation.

In testimony whereof I hereunto affix my signature in the presence of two witnesses.

JOSEPH KRIZEK.

Witnesses:
PETER KITCHEN,
E. A. MARTIN.